United States Patent
Ota et al.

(10) Patent No.: US 8,822,002 B2
(45) Date of Patent: Sep. 2, 2014

(54) FLUORINE-CONTAINING ELASTOMER COMPOSITION AND MOLDED ARTICLE COMPRISING THE SAME

(75) Inventors: Daisuke Ota, Settsu (JP); Katsusada Tokuhira, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 782 days.

(21) Appl. No.: 12/301,555

(22) PCT Filed: May 17, 2007

(86) PCT No.: PCT/JP2007/060100
§ 371 (c)(1),
(2), (4) Date: Nov. 19, 2008

(87) PCT Pub. No.: WO2007/135937
PCT Pub. Date: Nov. 29, 2007

(65) Prior Publication Data
US 2009/0263603 A1 Oct. 22, 2009

(30) Foreign Application Priority Data
May 19, 2006 (JP) ................................ 2006-139996

(51) Int. Cl.
*B32B 1/08* (2006.01)
(52) U.S. Cl.
USPC .......... 428/36.9; 524/424; 524/236; 524/330; 525/326.3
(58) Field of Classification Search
USPC ........ 428/36.9; 524/424, 236, 330; 525/326.3
See application file for complete search history.

(56) References Cited

U.S. PATENT DOCUMENTS

| | | | |
|---|---|---|---|
| 6,252,006 B1 * | 6/2001 | Tomihashi et al. | 525/326.3 |
| 2005/0256233 A1 * | 11/2005 | Ocho et al. | 524/59 |
| 2009/0124759 A1 * | 5/2009 | Washino et al. | 525/199 |

FOREIGN PATENT DOCUMENTS

| | | | |
|---|---|---|---|
| EP | 1 167 442 A1 | | 1/2002 |
| EP | 1 518 898 A1 | | 3/2005 |
| EP | 1518898 A1 | * | 3/2005 |
| EP | 1 637 560 A1 | | 3/2006 |
| EP | 1637560 A1 | * | 3/2006 |
| EP | 2019127 A1 | * | 1/2009 |
| JP | 07-082449 | * | 3/1995 |
| JP | 07-082449 A | | 3/1995 |
| JP | 2000-198882 A | | 7/2000 |
| JP | 2000-351882 | * | 12/2000 |
| JP | 2000-351882 A | | 12/2000 |
| JP | 2002-003677 | * | 1/2002 |
| JP | 2002-003677 A | | 1/2002 |
| JP | 2005-015781 A | | 1/2005 |
| JP | 2005-154529 | * | 6/2005 |
| JP | 2005-154529 A | | 6/2005 |
| JP | 2006-70132 A | | 3/2006 |
| JP | 2007-131720 A | | 5/2007 |
| WO | 98/07784 A1 | | 2/1998 |
| WO | 03104321 A1 | | 12/2003 |
| WO | WO-03/104321 A1 | * | 12/2003 |
| WO | 2004067618 A1 | | 8/2004 |
| WO | WO-2004-067618 A1 | * | 8/2004 |
| WO | WO-2007/135937 A1 | * | 11/2007 |
| WO | WO-2007-135937 A1 | * | 11/2007 |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

An object of the present invention is to provide a fluorine-containing elastomer composition being flexible and having excellent fuel barrier property, heat resistance, chemical resistance and oil resistance. Another object of the present invention is to provide a sealing material, a molded article and a fuel hose obtained by crosslinking the fluorine-containing elastomer composition. The composition is a fluorine-containing elastomer composition comprising a polyol-crosslinkable fluorine-containing elastomer, a polyol crosslinking agent and a hydrotalcite, wherein an acid acceptor comprising only an oxide or hydroxide of a divalent metal is contained in an amount of not more than 2 parts by weight based on 100 parts by weight of the fluorine-containing elastomer.

12 Claims, No Drawings

FLUORINE-CONTAINING ELASTOMER COMPOSITION AND MOLDED ARTICLE COMPRISING THE SAME

TECHNICAL FIELD

The present invention relates to a fluorine-containing elastomer composition comprising a polyol-crosslinkable fluorine-containing elastomer, a polyol crosslinking agent and a hydrotalcite. The present invention further relates to a molded article, a sealing material and a fuel hose which are made of the fluorine-containing elastomer composition.

BACKGROUND ART

For so-called peripheral parts of fuel system such as a fuel hose and tube of automobiles, so far rubbers have been mainly used. However, in order to cope with regulations on evaporation gas (LEVII) which are put in force in California, and other states of USA, materials therefor have been shifted to those having more satisfactory fuel impermeability, for example, rubber materials have been shifted from acrylonitrile-butadiene rubber (NBR) to fluorine-containing rubbers.

In the meantime, from the viewpoint of exhausting of fossil fuels and regulations on $CO_2$ emission, there are increasing expectations for bio fuels produced from agricultural products such as rapeseed, soy bean and sugar cane, agriculture wastes such as barley straw and rice hulls and other general wastes, and investigations on bio diesel fuels including a methyl ester of higher fatty acid (FEME) are in progress as an alternative for diesel oil. Bio diesel fuel is one obtained by esterification of higher fatty acid resulting from oil expression of bio mass, mainly plants. Examples thereof are, for instance, rapeseed methyl ester, soybean oil methyl ester, sunflower oil methyl ester, coconut oil methyl ester, and palm oil methyl ester. The above-mentioned fatty acids subjected to esterification are used alone as a bio diesel oil, or are used in a mixture with diesel oil, for example, in a mixture of diesel oil and bio diesel of 90:10 (% by volume).

However, in the case of use of such a bio diesel fuel, there is a problem that conventional peripheral parts of fuel system made of fluorine-containing rubbers are rapidly deteriorated. It is conjectured that the cause for that is such that hydrolysis of a methyl ester of higher fatty acid is accelerated by an influence of water or temperature, thereby generating higher fatty acid and methanol, namely, a methyl ester of higher fatty acid, methanol and higher fatty acid exist together in the bio diesel fuel, resulting in deterioration of fluorine-containing rubbers.

In order to solve such a problem, a method of using a fluorine-containing elastomer composition comprising a hydrotalcite dispersed therein is known (for example, cf. WO 2004/067618). However, an influence of higher fatty acid is not sufficiently investigated in WO 2004/067618. In addition, a peroxide crosslinking agent is used for the fluorine-containing elastomer disclosed in WO 2004/067618. When crosslinking is carried out by using a peroxide crosslinking agent, in the case of bio diesel fuel prepared by adding a higher fatty acid to diesel oil, there is a problem that a degree of swelling in the bio diesel fuel is large and surface condition becomes deteriorated.

In addition, a polyol-vulcanizable fluorine-containing rubber composition comprising a hydrotalcite is disclosed as a fluorine-containing rubber composition having improved resistance to engine oil (for example, cf. JP7-82449A). However, in JP7-82449A, an influence of higher fatty acid as mentioned above is not investigated, and in addition, the fluorine-containing rubber composition disclosed in JP7-82449A is one comprising a hydrotalcite and an oxide of a divalent metal as an acid acceptor, which gives rise to a problem that a molded article obtained from the composition is subject to lowering of physical properties and deterioration of its surface.

DISCLOSURE OF INVENTION

It is an object of the present invention to provide a fluorine-containing elastomer composition having flexibility and being excellent in properties such as fuel barrier property, heat resistance, chemical resistance and oil resistance. In addition, it is another object of the present invention to provide a molded article, a sealing material and a fuel hose which are obtained by crosslinking the fluorine-containing elastomer composition.

Namely, the present invention relates to a fluorine-containing elastomer composition comprising a polyol-crosslinkable fluorine-containing elastomer, a polyol crosslinking agent and a hydrotalcite, wherein an acid acceptor comprising only an oxide or hydroxide of a divalent metal is contained in an amount of not more than 2 parts by weight based on 100 parts by weight of the fluorine-containing elastomer.

It is preferable that the hydrotalcite is a compound represented by the general formula (1):

wherein $M_1^{2+}$ is a divalent metal ion, $M^{3+}$ is a trivalent metal ion, $A^{n-}$ is a n-valent anion, x is a numerical value satisfying $0<x<0.5$, m is a numerical value satisfying $0 \leq m$.

It is preferable that in the general formula (1), $M_1^{2+}$ is $Mg^{2+}$ and/or $Zn^{2+}$, $M^{3+}$ is $Al^{3+}$, and $A^{n-}$ is $CO_3^{2-}$.

It is preferable that the above-mentioned fluorine-containing elastomer composition does not contain a peroxide crosslinking agent and/or a peroxide crosslinking accelerator.

In addition, the present invention relates to a molded article, a sealing material and a fuel hose which are obtained by crosslinking the above-mentioned fluorine-containing elastomer composition.

BEST MODE FOR CARRYING OUT THE INVENTION

The present invention relates to the fluorine-containing elastomer composition comprising a polyol-crosslinkable fluorine-containing elastomer, a polyol crosslinking agent and a hydrotalcite, wherein an acid acceptor comprising only an oxide or hydroxide of a divalent metal is contained in an amount of not more than 2 parts by weight based on 100 parts by weight of the fluorine-containing elastomer.

The hydrotalcite is not limited particularly, and from the viewpoint of availability, is more preferably a compound represented by the general formula (1):

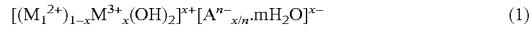

wherein $M_1^{2+}$ is a divalent metal ion, $M^{3+}$ is a trivalent metal ion, $A^{n-}$ is a n-valent anion, x is a numerical value satisfying $0<x<0.5$, m is a numerical value satisfying $0 \leq m$.

In addition, the hydrotalcite may be natural one or synthetic one.

$M_1^{2+}$ represents a divalent metal ion, and examples thereof are, for instance, $Mg^{2+}$, $Mn^{2+}$, $Fe^{2+}$, $Co^{2+}$, $Ni^{2+}$, $Cu^{2+}$ and $Zn^{2+}$. Among these, $Mg^{2+}$ and/or $Zn^{2+}$ are preferable from the viewpoint of availability.

$M^{3+}$ represents a trivalent metal ion, and examples thereof are, for instance, $Al^{3+}$, $Fe^{3+}$, $Cr^{3+}$, $Co^{3+}$ and $In^{3+}$. Among these, $Al^{3+}$ is preferable from the viewpoint of availability.

$A^{n-}$ represents a n-valent anion, and examples thereof are, for instance, $OH^-$, $F^-$, $Cl^-$, $Br^-$, $NO_3^-$, $CO_3^{2-}$, $SO_4^{2-}$, $Fe(CN)_6^{3-}$, $CH_3COO^-$, oxalic acid ion and salicylic acid ion. Among these, $CO_3^{2-}$ is preferable from the viewpoint of availability.

x is a numerical value satisfying $0<x<0.5$, preferably a numerical value satisfying $0.2 \le x \le 0.4$, more preferably a numerical value satisfying $0.2 \le x \le 0.33$. It is preferable that x is within this range, because production of hydrotalcite is stable.

m is a numerical value satisfying $0 \le m$, preferably a numerical value satisfying $0 \le m \le 1$.

Hydrotalcites are nonstoichiometric compounds represented by the general formula (1), and among these compounds, from the viewpoint of availability, at least one kind of compound selected from the group consisting of $Mg_6Al_2(OH)_{16}CO_3 \cdot 4H_2O$, $Mg_{4.5}Al_2(OH)_{13}CO_3 \cdot mH_2O$ ($0 \le m$), $Mg_4Al_2(OH)_{12}CO_3 \cdot 5H_2O$, $Mg_5Al_2(OH)_{14}CO_3 \cdot 4H_2O$, $Mg_3Al_2(OH)_{10}CO_3 \cdot 1.7H_2O$ and $Mg_3ZnAl_2(OH)_{12}CO_3 \cdot mH_2O$ ($0 \le m$) is preferable, and more preferable are $Mg_6Al_2(OH)_{16}CO_3 \cdot 4H_2O$, $Mg_{4.5}Al_2(OH)_{13}CO_3 \cdot 3.5H_2O$ and $Mg_3ZnAl_2(OH)_{12}CO_3 \cdot mH_2O$ ($0<m$).

The amount of hydrotalcite is preferably 0.1 to 30 parts by weight, more preferably 0.1 to 10 parts by weight, further preferably 0.1 to 6 parts by weight based on 100 parts by weight of the polyol-crosslinkable fluorine-containing elastomer. When the amount of hydrotalcite is less than 0.1 part by weight, a crosslinking time tends to be increased and a degree of crosslinking tends to be lowered. When the amount exceeds 30 parts by weight, there is a tendency that kneading of rubber becomes difficult, hardness of a molded article increases and a Mooney viscosity of the fluorine-containing elastomer composition increases, thus making molding difficult.

While the hydrotalcite used in the present invention functions as an acid acceptor, in the present invention, the amount of an acid acceptor comprising only an oxide or hydroxide of a divalent metal is not more than 2 parts by weight, preferably not more than 1.5 parts by weight, more preferably not more than 1.0 part by weight, further preferably not more than 0.5 part by weight based on 100 parts by weight of the fluorine-containing elastomer, and it is particularly preferable that the acid acceptor is not contained. When there is a problem that a vulcanization speed is slow, an acid acceptor comprising only an oxide or hydroxide of a divalent metal may be mixed as far as its amount is not more than 2 parts by weight. However, under strict environment, for example, in the case of a fuel temperature exceeding 120° C., since in some cases, the obtained molded article swells and is deteriorated, it is preferable not to mix the acid acceptor. When the amount of an acid acceptor comprising only an oxide or hydroxide of a divalent metal exceeds 2 parts by weight, the obtained molded article, sealing material and fuel hose are subject to swelling, lowering of physical properties and surface deterioration, which is not preferable.

Examples of the divalent metal are magnesium, calcium, barium, lead and zinc, and examples of the oxide and hydroxide of a divalent metal are, for instance, calcium hydroxide, magnesium oxide, magnesium hydroxide, calcium oxide, zinc oxide, zinc hydroxide and lead oxide.

When the composition of the present invention is used, swelling, lowering of physical properties and surface deterioration of the obtained molded article, sealing material and fuel hose can be inhibited.

The polyol-crosslinkable fluorine-containing elastomer used in the present invention is a fluorine-containing rubber having polyol-crosslinkable moiety. Example of a polyol-crosslinkable moiety is a moiety having vinylidene fluoride (VdF) unit. Particularly a fluorine-containing rubber comprising VdF unit is preferable.

Examples of the fluorine-containing rubber having polyol-crosslinkable moiety are nonperfluoro fluorine-containing rubbers (a) and perfluoro fluorine-containing rubbers (b). Perfluoro fluorine-containing rubbers are those comprising not less than 90% by mole of perfluoro monomer in component units.

Examples of the nonperfluoro fluorine-containing rubbers (a) are fluorine-containing VdF type rubbers, fluorine-containing tetrafluoroethylene (TFE)/propylene type rubbers, fluorine-containing TFE/propylene/VdF type rubbers, fluorine-containing ethylene/hexafluoropropylene (HFP) type rubbers, fluorine-containing ethylene/HFP/VdF type rubbers, fluorine-containing ethylene/HFP/TFE type rubbers, fluorine-containing fluorosilicone type rubbers, and fluorine-containing fluorophosphazene type rubbers. These can be used alone or can be used in an optional combination to such an extent not to impair the effects of the present invention.

Examples of preferable fluorine-containing VdF type rubbers are those represented by the following general formula (2).

  (2)

(In the formula, the structural unit $M^1$ is a structural unit derived from vinylidene fluoride ($m^1$), the structural unit $M^2$ is a structural unit derived from a fluorine-containing ethylenic monomer ($m^2$), and the structural unit $N^1$ is a repeat unit derived from a monomer ($n^1$) being copolymerizable with the monomer ($m^1$) and the monomer ($m^2$).)

In the fluorine-containing VdF type rubbers represented by the general formula (2), preferable is one comprising 30 to 85% by mole of the structural unit $M^1$ and 55 to 15% by mole of the structural unit $M^2$, and more preferable is one comprising 50 to 80% by mole of the structural unit $M^1$ and 50 to 20% by mole of the structural unit $M^2$. It is preferable that the structural unit $N^1$ is contained in an amount of 0 to 20% by mole based on the total amount of the structural unit $M^1$ and the structural unit $M^2$.

One or two or more monomers can be used as the fluorine-containing ethylenic monomer ($m^2$), and, for example, there are fluorine-containing monomers such as TFE, chlorotrifluoroethylene (CTFE), trifluoroethylene, HFP, trifluoropropylene, tetrafluoropropylene, pentafluoropropylene, trifluorobutene, tetrafluoroisobutene, perfluoro(alkyl vinyl ether) (PAVE) and vinyl fluoride. Among these, TFE, HFP and PAVE are preferable.

Any one can be used as the monomer ($n^1$) as far as it is copolymerizable with the monomer ($m^1$) and the monomer ($m^2$), and, for example, there are ethylene, propylene, alkyl vinyl ether and monomers giving cure site.

Examples of monomers giving cure site are iodine- or bromine-containing monomers represented by the general formula (3):

  (3)

wherein $Y^1$ is hydrogen atom, fluorine atom or $-CH_3$; $R_f^1$ is a fluoroalkylene group, a perfluoroalkylene group, a fluoropolyoxyalkylene group or a perfluoropolyoxyalkylene group; $R^1$ is hydrogen atom or $-CH_3$; $X^1$ is iodine atom or bromine atom, monomers represented by the general formula (4):

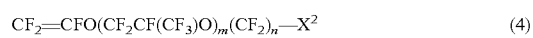  (4)

wherein m is 0 or an integer of 1 to 5; n is an integer of 1 to 3; $X^2$ is cyano, carboxyl, alkoxycarbonyl, bromine atom or iodine atom, and monomers represented by the general formula (5):

  (5)

wherein p is an integer of 1 to 10. For example, there are iodine-containing monomers such as perfluoro(6,6-dihydro-6-iodo-3-oxa-1-hexene) and perfluoro(5-iodo-3-oxa-1-pentene) disclosed in JP5-63482B and JP7-316234A, iodine-containing monomers such as CF$_2$=CFOCF$_2$CF$_2$CH$_2$I disclosed in JP4-217936A, iodine-containing monomers such as 4-iodo-3,3,4,4-tetrafluoro-1-butene disclosed in JP61-55138A, bromine-containing monomers disclosed in JP4-505341A, cyano-containing monomers, carboxyl-containing monomers and alkoxycarbonyl-containing monomers disclosed in JP4-505345A and JP5-500070A, and the like. These can be used alone or can be used in an optional combination thereof.

Specific examples of such fluorine-containing VdF type rubbers are preferably VdF/HFP rubbers, VdF/HFP/TFE rubbers, VdF/CTFE rubbers, VdF/CTFE/TFE rubbers and the like.

Preferable examples of fluorine-containing TFE/propylene type rubbers are those represented by the following general formula (6).

$-(M^3)-(M^4)-(N^2)-$      (6)

(In the formula, the structural unit $M^3$ is a structural unit derived from TFE ($m^3$), the structural unit $M^4$ is a structural unit derived from propylene ($m^4$), and the structural unit $N^2$ is a repeat unit derived from a monomer ($n^2$) being copolymerizable with the monomer ($m^3$) and the monomer ($m^4$).)

In the fluorine-containing TFE/propylene type rubbers represented by the general formula (6), preferable is one comprising 40 to 70% by mole of the structural unit $M^3$ and 60 to 30% by mole of the structural unit $M^4$, and more preferable is one comprising 50 to 60% by mole of the structural unit $M^3$ and 50 to 40% by mole of the structural unit $M^4$. It is preferable that the structural unit $N^2$ is contained in an amount of 0 to 40% by mole based on the total amount of the structural unit $M^3$ and the structural unit $M^4$.

Any one can be used as the monomer ($n^2$) as far as it is copolymerizable with the monomer ($m^3$) and the monomer ($m^4$), and monomers giving cure site are preferable. For example, there are VdF and ethylene.

Preferable examples of perfluoro fluorine-containing rubbers (b) are those represented by the following general formula (7).

$-(M^5)-(M^6)-(N^3)-$      (7)

(In the formula, the structural unit $M^5$ is a structural unit derived from tetrafluoroethylene ($m^5$), the structural unit $M^6$ is a structural unit derived from perfluoro(alkyl vinyl ether) or perfluoro(alkoxy vinyl ether) ($m^6$), and the structural unit $N^3$ is a repeat unit derived from a monomer ($n^3$) being copolymerizable with the monomer ($m^5$) and the monomer ($m^6$).)

In the perfluoro fluorine-containing rubbers (b) represented by the general formula (7), preferable is one comprising 50 to 90% by mole of the structural unit $M^5$ and 10 to 50% by mole of the structural unit $M^6$, and more preferable is one comprising 50 to 80% by mole of the structural unit $M^5$ and 20 to 50% by mole of the structural unit $M^6$. An amount of the structural unit $N^3$ is preferably 0 to 5% by mole, more preferably 0 to 2% by mole based on the total amount of the structural unit $M^5$ and the structural unit $M^6$. If the proportion thereof is out of these ranges, properties as a rubber elastic body are lost, and the properties thereof tend to be similar to those of a resin.

Examples of the perfluoro(alkyl vinyl ether) ($m^6$) are perfluoro(methyl vinyl ether), perfluoro(propyl vinyl ether), and the like, and these can used alone or can be used in an optional combination thereof.

Examples of the perfluoro(alkoxy vinyl ether) ($m^6$) which can be used are monomers described, for example, in JP61-223007A.

Any one can be used as the monomer ($n^3$) as far as it is copolymerizable with the monomer ($m^5$) and the monomer ($m^6$), and monomers giving cure site are preferable.

Example of such a monomer giving cure site are vinylidene fluoride, iodine- or bromine-containing monomers represented by the general formula (3), and monomers represented by the general formulas (4) and (5), and there are, for example, iodine-containing monomers such as perfluoro(6,6-dihydro-6-iodo-3-oxa-1-hexene) and perfluoro(5-iodo-3-oxa-1-pentene) disclosed in JP5-63482B and JP7-316234A, iodine-containing monomers such as CF$_2$=CFOCF$_2$CF$_2$CH$_2$I disclosed in JP4-217936A, bromine-containing monomers disclosed in JP4-505341A, cyano-containing monomers, carboxyl-containing monomers and alkoxycarbonyl-containing monomers disclosed in JP4-505345A and JP5-500070A, and the like. These can be used alone or can be used in an optional combination thereof.

These iodine atom, bromine atom, vinyl, cyano, carboxyl and alkoxycarbonyl can function as cure site.

Examples of the perfluoro fluorine-containing rubber (b) are fluorine-containing rubbers disclosed in WO 97/24381, JP61-57324B, JP4-81608B and JP5-13961B.

In these rubbers, fluorine-containing rubbers comprising VdF and at least one kind of fluorine-containing monomer are preferable as the polyol-crosslinkable fluorine-containing elastomer irrespective of nonperfluoro fluorine-containing rubber or perfluoro fluorine-containing rubber, and especially preferable is at least one kind of rubber selected from the group consisting of fluorine-containing VdF/HFP type rubbers, fluorine-containing VdF/TFE/HFP type rubbers and fluorine-containing VdF/TFE/PAVE type rubbers.

The above-explained nonperfluoro fluorine-containing rubber (a) and perfluoro fluorine-containing rubber (b) can be prepared by usual processes, and an example of a preferable preparation process is iodine transfer polymerization known as a preparation process of a fluorine-containing rubber because a molecular weight distribution of the obtained polymer is narrow, control of a molecular weight is easy, and iodine atom can be introduced to an end of a polymer. For example, there is exemplified a process of carrying out emulsion polymerization or solution polymerization in the presence of a radical initiator while stirring the above-mentioned ethylenic monomer and, if necessary, a monomer giving cure site under pressure in the presence of an iodine compound, preferably a diiodine compound in an aqueous medium substantially in the absence of oxygen. A representative example of the iodine compound to be used is a compound represented by the general formula (8):

$R^2I_xBr_y$      (8)

wherein x and y are respectively integers of 0 to 2, and satisfy $1 \le x+y \le 2$, $R^2$ is a saturated or unsaturated fluorohydrocarbon group or chlorofluorohydrocarbon group having 1 to 16 carbon atoms, or a hydrocarbon group having 1 to 3 carbon atoms, and may contain an oxygen atom. An iodine atom or a bromine atom is introduced into the terminal of a fluorine-containing rubber obtained by using such an iodine compound.

Examples of the compound represented by the general formula (8) are 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and monoiodo-monobromo-substituted product, diiodo-substituted product, and (2-iodoethyl)- or (2-bromoethyl)-substituted product of benzene. These compounds may be used alone, or can be used in combination thereof.

In these compounds, 1,4-diiodoperfluorobutane and diiodomethane are preferable from the viewpoint of polymerization reactivity, crosslinking reactivity and availability.

The radical polymerization initiator used in the present invention may be the same as an initiator that has been used for polymerization of a fluorine-containing elastomer. Examples of such an initiator are organic and inorganic peroxides and azo compounds. Represented initiators are persulfates, percarbonates and peresters, and a preferable initiator is ammonium persulfate (APS). APS can be used alone or can be used in combination with reducing agents such as sulfites.

The emulsifier used for emulsion polymerization can be selected from a wide range, and from the viewpoint of inhibiting the chain transfer reaction to the emulsifier molecules that occurs during polymerization, salts of carboxylic acid having a fluorocarbon chain or a fluoropolyether chain are desirable. The amount of the emulsifier is preferably about 0.005 to 2% by weight, particularly preferably 0.01 to 1.5% by weight based on the added water.

The monomer mixture gas to be used in the present invention is explosive as described in Advances in Chemistry Series, G. H. Kalb, et al., 129, 13 (1973), and therefore it is necessary to design a polymerization equipment not to cause sparking which becomes an ignition source.

The polymerization pressure can be changed in a wide range, and generally is within a range from 0.5 to 7 MPa. The higher the polymerization pressure is, the more a polymerization speed is increased. Accordingly from the viewpoint of improvement in productivity, the polymerization pressure is preferably not less than 0.8 MPa.

An adding amount of the compound represented by the general formula (8) may be optionally changed to adjust the molecular weight of the fluorine-containing elastomer, and is 0.0001 to 15% by weight based on the total weight of the obtained fluorine-containing elastomer.

In the present invention, compounds known as a crosslinking agent for fluorine-containing elastomers can be used as the polyol crosslinking agent to be used, and, for example, polyhydroxy compounds, particularly polyhydroxy aromatic compounds are suitably used from the viewpoint of excellent heat resistance.

The crosslinking by polyol crosslinking system is suitable because there are characteristics that a carbon-oxygen bond is introduced to the cure site, compression set is small, moldability is satisfactory, and sealing property is excellent.

The above-mentioned polyhydroxy aromatic compounds are not limited particularly, and for example, there are 2,2-bis(4-hydroxyphenyl)propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, 3,3',5,5'-tetrabromobisphenol A and the like. Those polyhydroxy aromatic compounds may be alkali metal salts, alkali earth metal salts and the like. However in the case of coagulating a fluorine-containing elastomer by using an acid, it is preferable not to use the above-mentioned metal salts. In these compounds, bisphenol AF is preferable from the viewpoint of satisfactory heat resistance of the obtained molded article.

In polyol crosslinking system, usually a crosslinking accelerator is used together with a polyol crosslinking agent. When a crosslinking accelerator is used, formation of intermolecular double bond in dehydrofluorination reaction of a trunk chain of a fluorine-containing elastomer is accelerated, thereby enabling crosslinking reaction to be accelerated.

Generally onium compounds are used as a crosslinking accelerator for polyol crosslinking system. An onium compound is not limited particularly and there are, for example, ammonium compounds such as quaternary ammonium salts, phosphonium compounds such as quaternary phosphonium salts, oxonium compounds, sulfonium compounds, cyclic amines, mono-functional amine compounds and the like. In these compounds, quaternary ammonium salts and quaternary phosphonium salts are preferable.

The quaternary ammonium salt is not limited particularly, and examples thereof are, for instance, 8-methyl-1,8-diazabicyclo[5,4,0]-7-undeceniumchloride, 8-methyl-1,8-diazabicyclo[5,4,0]-7-undeceniumiodide, 8-methyl-1,8-diazabicyclo[5,4,0]-7-undeceniumhydroxide, 8-methyl-1,8-diazabicyclo[5,4,0]-7-undeceniummethylsulfate, 8-ethyl-1,8-diazabicyclo[5,4,0]-7-undeceniumbromide, 8-propyl-1,8-diazabicyclo[5,4,0]-7-undeceniumbromide, 8-dodecyl-1,8-diazabicyclo[5,4,0]-7-undeceniumchloride, 8-dodecyl-1,8-diazabicyclo[5,4,0]-7-undeceniumhydroxide, 8-eicosyl-1,8-diazabicyclo[5,4,0]-7-undeceniumchloride, 8-tetracosyl-1,8-diazabicyclo[5,4,0]-7-undeceniumchloride, 8-benzyl-1,8-diazabicyclo[5,4,0]-7-undeceniumchloride (hereinafter referred to as DBU-B), 8-benzyl-1,8-diazabicyclo[5,4,0]-7-undeceniumhydroxide, 8-phenetyl-1,8-diazabicyclo[5,4,0]-7-undeceniumchloride, 8-(3-phenylpropyl)-1,8-diazabicyclo[5,4,0]-7-undeceniumchloride and the like. Among these, DBU-B is preferable from the viewpoint of crosslinkability and physical properties of a crosslinked product.

The quaternary phosphonium salt is not limited particularly, and examples thereof are, for instance, tetrabutylphosphonium chloride, benzyltriphenylphosphonium chloride (hereinafter referred to as BTPPC), benzyltrimethylphosphonium chloride, benzyltributylphosphonium chloride, tributylallylphosphonium chloride, tributyl-2-methoxypropylphosphonium chloride, benzylphenyl(dimethylamino)phosphonium chloride and the like. Among these, benzyltriphenylphosphonium chloride (BTPPC) is preferable from the viewpoint of crosslinkability and physical properties of a crosslinked product.

In addition, quaternary ammonium salts, solid solutions of quaternary phosphonium salts and bisphenol AF, and chlorine-free crosslinking accelerators disclosed in JP11-147891A can be used as a crosslinking accelerator.

The amount of polyol crosslinking agent is preferably 0.01 to 5 parts by weight, more preferably 0.1 to 4 parts by weight, further preferably 0.1 to 3 parts by weight based on 100 parts by weight of the polyol-crosslinkable fluorine-containing elastomer. When the amount of crosslinking agent is less than 0.01 part by weight, crosslinking of the fluorine-containing elastomer does not proceed sufficiently, and heat resistance and oil resistance of the obtained fluorine-containing elastomer composition tend to be lowered. When the amount of crosslinking agent exceeds 5 parts by weight, mold-processability of the obtained fluorine-containing elastomer composition tends to be lowered.

The amount of crosslinking accelerator is preferably 0.01 to 5 parts by weight, more preferably 0.01 to 3 parts by weight, further preferably 0.01 to 2 parts by weight based on 100 parts by weight of the polyol-crosslinkable fluorine-containing elastomer. When the amount of crosslinking accelerator is less than 0.01 part by weight, crosslinking of the fluorine-containing elastomer does not proceed sufficiently, and heat resistance and oil resistance of the obtained fluorine-containing elastomer composition tend to be lowered. When the amount of crosslinking accelerator exceeds 5 parts by weight, mold-processability and physical properties of the obtained fluorine-containing elastomer composition tend to be lowered.

In addition, a polyamine crosslinking agent or the like usually used as a crosslinking agent for fluorine-containing elastomers may be used together with the above-mentioned polyol crosslinking agent. However, it is preferable not to use a peroxide crosslinking agent because swelling due to bio diesel fuel can be inhibited.

In addition, it is possible to blend various usual additives to be blended to a fluorine-containing elastomer composition as case demands, for example, a filler, a processing aid, a plasticizer, a colorant, a stabilizer, an adhesion aid, a mold releasing agent, an electric conductivity imparting agent, a thermal conductivity imparting agent, an agent for imparting non-adhesiveness to surface, a flexibility imparting agent, a heat resistance improver, a flame retardant and the like. To the composition may be blended one or more usual crosslinking agents or crosslinking accelerators which are different from those mentioned above.

The above-mentioned fluorine-containing elastomer composition can be obtained by kneading the fluorine-containing elastomer, polyol crosslinking agent, hydrotalcite, and other compounding agents to be blended as case demands such as a crosslinking accelerator and a filler by using a rubber kneading equipment generally used. A roll, kneader, Banbury mixer, internal mixer, twin screw extruder or the like can be used as the rubber kneading equipment.

Particularly when using a polyhydroxy compound as a crosslinking agent, in many cases, melting points of a crosslinking agent and a crosslinking accelerator are relatively high, and in order to uniformly disperse them in the rubber, preferable is a method of kneading a crosslinking agent and a crosslinking accelerator while melting at high temperature of 120° to 200° C. by using a closed kneading equipment such as a kneader and then kneading other compounding agents such as a filler at relatively low temperature lower than the temperature mentioned above. In addition, there is a method of uniformly dispersing by using a solid solution having a lowered melting point obtained by once melting a crosslinking agent and a crosslinking accelerator.

Dispersibility can be further increased by kneading the fluorine-containing elastomer, polyol crosslinking agent, hydrotalcite, and as case demands, other compounding agents such as a crosslinking accelerator and a filler, allowing to stand at room temperature for 12 hours or more and then carrying out kneading again.

In addition, the present invention relates to the molded article, the sealing material and the fuel hose which are obtained by crosslinking the above-mentioned fluorine-containing elastomer composition.

Crosslinking conditions may be optionally determined depending on kind of a crosslinking agent, etc., and usually crosslinking is carried out by heating at 150° to 300° C. for one minute to 24 hours.

For crosslinking, usual methods such as steam crosslinking can be employed, and in addition, it is possible to carry out a crosslinking reaction under any conditions such as under normal pressure, under pressure, under reduced pressure or in the air.

The molded article of the present invention encompasses a laminated structure having a layer comprising a crosslinked product obtained from the fluorine-containing elastomer composition of the present invention and a layer comprising other material.

The other material may be selected appropriately according to required properties and intended applications. Examples of the other material are, for instance, thermoplastic polymers such as polyolefin (for instance, high-density polyethylene, middle-density polyethylene, low-density polyethylene, linear low-density polyethylene, ethylene-propylene copolymer and polypropylene), nylon, polyester, vinyl chloride resin (PVC) and vinylidene chloride resin (PVDC), crosslinked rubbers such as ethylene-propylene-diene rubber (EPDM), butyl rubber, nitrile rubber, silicone rubber, acrylic rubber, epichlorohydrin rubber and styrene-butadiene rubber, thermoplastic elastomers such as polypropylene/EPDM complex, metals, glass, wood, ceramics, etc.

In the molded article having a laminated structure, a layer of an adhesive agent may be inserted between the layer comprising the crosslinked product of the fluorine-containing elastomer composition of the present invention and the substrate layer comprising other material. The layer comprising the crosslinked product of the fluorine-containing elastomer composition of the present invention and the substrate layer comprising other material can be adhered strongly and integrated by inserting the layer of an adhesive agent. Examples of the adhesive agent used in the layer of the adhesive agent are a diene polymer modified with acid anhydride; a polyolefin modified with acid anhydride; a mixture (for example, a reaction product of a glycol compound such as 1,6-hexamethylene glycol and a diisocyanate compound such as 2,4-tolylene diisocyanate in a molar ratio of 1 to 2; a reaction product of a triol compound such as trimethylolpropane and a diisocyanate compound such as 2,4-tolylenediisocyanate in a molar ratio of 1 to 3; or the like) of a high molecular weight polyol (for example, polyester polyol obtained by polycondensation of a glycol compound such as ethylene glycol or propylene glycol with a dibasic acid such as adipic acid; a partly-saponified compound of a copolymer of vinyl acetate and vinyl chloride; or the like) and a polyisocyanate compound (for example, 2,4-tolylene diisocyanate); and the like. Also, known processes such as co-extrusion, co-injection and extrusion coating can be used for forming a laminated structure.

The present invention encompasses a fuel hose obtained by single use of the crosslinked product of the fluorine-containing elastomer composition of the present invention.

In addition, the present invention encompasses a multilayered fuel hose having a layer comprising the crosslinked product of the fluorine-containing elastomer composition of the present invention. The multilayered fuel hose or a multi-layered fuel container is one comprising a layer comprising the crosslinked product of the fluorine-containing elastomer composition of the present invention and at least one layer comprising other material. These layers are adhered to each other without sandwiching an adhesive layer between them or by sandwiching an adhesive layer between them.

Examples of the layer comprising other material are a layer comprising a rubber other than the crosslinked product of the fluorine-containing elastomer composition of the present invention and a layer comprising a thermoplastic resin.

Examples of the rubber are preferably at least one rubber selected from the group consisting of an acrylonitrile-butadiene rubber or a hydrogenated rubber thereof, a blend rubber of acrylonitrile-butadiene rubber and polyvinyl chloride, an epichlorohydrin rubber, EPDM, an acrylic rubber, an ethylene acrylic rubber and a styrene-butadiene rubber from the viewpoint of chemical resistance and flexibility. It is more preferable that the rubber is at least one rubber selected from the group consisting of an acrylonitrile-butadiene rubber or a hydrogenated rubber thereof, a blend rubber of acrylonitrile-butadiene rubber and polyvinyl chloride and an epichlorohydrin rubber.

The thermoplastic resin is preferably a thermoplastic resin comprising at least one selected from the group consisting of a fluororesin, a polyamide resin, a polyolefin resin, a polyester resin, a poly(vinyl alcohol) resin, a polyvinyl chloride resin and a poly(phenylene sulfide) resin from the viewpoint of fuel barrier property. It is more preferable that the thermoplastic resin is a thermoplastic resin comprising at least one selected from the group consisting of a fluororesin, a polyamide resin, a poly(vinyl alcohol) resin and a poly(phenylene sulfide) resin.

Applications of the fuel hose of the present invention is not particularly limited, and examples thereof are fuel hoses such as a filler hose, an evaporation hose and a breather hose for an automobile; and fuel containers such as a fuel container for an automobile, a fuel container for a two-wheel vehicle, a fuel container for a small electric generator and a fuel container for lawn mower.

Among these, with respect to a multilayered fuel hose comprising an innermost layer comprising the crosslinked product of the fluorine-containing elastomer composition of the present invention and a layer of the other rubber, preferable is a fuel hose having three layers comprising layers (for example, intermediate layer and outermost layer) of a blend rubber of acrylonitrile-butadiene rubber and polyvinyl chloride or an epichlorohydrin rubber and an innermost layer comprising the crosslinked product of the fluorine-containing elastomer composition of the present invention, or a fuel hose having two layers comprising an outer layer comprising an acrylonitrile-butadiene rubber or a hydrogenated rubber thereof, a blend rubber of acrylonitrile-butadiene rubber and polyvinyl chloride or an epichlorohydrin rubber and an inner layer comprising the crosslinked product of the fluorine-containing elastomer composition of the present invention, from the viewpoint of excellent fuel barrier property, flexibility and chemical resistance.

In addition, when producing a laminated structure having a layer comprising the crosslinked product of the fluorine-containing elastomer composition of the present invention and a layer of the other material, surface treatment may be carried out on the layer comprising the crosslinked product of the fluorine-containing elastomer composition of the present invention as case demands. Kind of the surface treatment is not limited particularly as far as it enables adhesion of the layers, and examples thereof are, for instance, discharge treatments such as plasma discharge treatment and corona discharge treatment, and a wet process such as treatment with metallic sodium/naphthalene solution. Also primer treatment is suitable for the surface treatment. The primer treatment can be conducted by usual method. While the primer treatment can be conducted on a surface of the layer comprising the crosslinked product of the fluorine-containing elastomer composition which was not subjected to surface treatment, it is more effective to previously subject a surface of the layer comprising the crosslinked product of the fluorine-containing elastomer composition to plasma discharge treatment, corona discharge treatment or treatment with metallic sodium/naphthalene solution and then carry out the primer treatment.

The fluorine-containing elastomer composition of the present invention and the molded article obtained from the composition can be suitably employed in the semiconductor-related field such as a semiconductor manufacturing equipment, a liquid crystal panel manufacturing equipment, a plasma panel manufacturing equipment, a plasma address liquid crystal panel, a field emission display panel and a substrate of a solar battery; in the field of automobiles; in the field of aircraft; in the field of rockets; in the field of ships; in the field of chemical products in a chemical plant; in the field of chemicals such as medical drugs; in the field of photography such as a developing equipment; in the field of printing such as printing machinery; in the field of coating such as coating facility; in the field of analytical-physical and chemical equipment; in the field of equipment of food plants; in the field of atomic power plant equipment; in the field of steel making such as an iron plate processing facility; in the field of general industries; in the field of electricity; in the field of fuel batteries; and the like. Among these fields, the fluorine-containing elastomer composition of the present invention and the molded article obtained from the composition can be used more suitably in the field of automobiles, aircraft, rocket and ships. The composition and the molded article are also useful as various coating compositions and coated articles.

In the field of automobiles, a gasket, a shaft seal, a valve stem seal, a sealing material and a hose can be used for an engine and its peripheral equipment; a hose and a sealing material can be used for an AT equipment; and an O (square) ring, a tube, a packing, a core material of a valve, a hose, a sealing material and a diaphragm can be used for a fuel system and its peripheral equipment. Specifically, examples are an engine head gasket, a metal gasket, a sump gasket, a crank shaft seal, a cam shaft seal, a valve stem seal, a manifold packing, an oil hose, a seal for an oxygen sensor, an ATF hose, an injector O ring, an injector packing, a fuel pump O ring, a diaphragm, a fuel hose, a crank shaft seal, a gear box seal, a power piston packing, a seal for a cylinder liner, a seal for a valve stem, a front pump seal of an automatic gear, a rear axle pinion seal, a gasket of a universal joint, a pinion seal of a speedometer, a piston cup of a foot brake, an O ring of torque transmission, an oil seal, a seal for an exhaust gas reheating equipment, a bearing seal, an EGR tube, a twin carburetor tube, a diaphragm for a sensor of a carburetor, a vibration-proof rubber (engine mount, exhaust outlet), a hose for a reheating equipment, and an oxygen sensor bush.

In the field of aircraft, rockets and ships, examples are a diaphragm, an O (square) ring, a valve, a tube, a packing, a hose and a sealing material, and these can be employed for a fuel system.

The molded article, sealing material and fuel hose of the present invention can be suitably used for bio diesel fuel. Bio diesel fuel is a mixture comprising diesel oil, higher fatty acid ester and/or higher fatty acid.

EXAMPLES

The present invention is then explained by means of examples, but the present invention is not limited to them.
<Hardness>

The fluorine-containing elastomer compositions prepared in examples and comparative examples are subjected to compression molding at 160° C. for 45 minutes with a hot press to prepare 2 mm thick sheet-like test pieces, and hardness thereof is measured according to JIS-K6253.

<100% Modulus, Tensile Strength at Break, Tensile Elongation at Break>

The fluorine-containing elastomer composition prepared in examples and comparative examples are subjected to compression molding at 160° C. for 45 minutes with a hot press to form into a 2 mm thick sheet, and 100% modulus, tensile strength at break, and tensile elongation at break are measured according to JIS-K6251.

<Vulcanization Characteristics>

When crosslinking the fluorine-containing elastomer composition prepared in examples and comparative examples under the following vulcanization conditions, a vulcanization curve at 160° C. is made using model JSR CURASTOMETER II, and minimum viscosity (ML), maximum viscosity (MH), induction time ($T_{10}$) and optimum vulcanization time ($T_{90}$) are obtained.

(Standard Vulcanization Conditions)
    Kneading method: kneading with a roll
    Vulcanization conditions: 160° C. for 45 minutes <Immersion Test>

The molded articles of fluorine-containing elastomer compositions prepared in examples and comparative examples are cut into 2 cm×4 cm (2 mm thick) to produce test pieces. Next, bio diesel model fuel (1) comprising pentadecane and oleic acid in a percent by volume ratio of 90:10, and bio diesel model fuel (2) comprising pentadecane and methyl oleate in a percent by volume ratio of 90:10 are prepared. A swelling ratio and surface condition when a test piece is immersed in the fuels at 100° C. for 330 hours are evaluated. The immersion test and calculation of a swelling ratio are conducted according to JIS-K6258, and surface condition is evaluated with naked eyes according to the following criteria.

3 . . . There is gloss on the surface.
2 . . . There is clouding on the surface.
1 . . . There are cracks on the surface, and the surface is rough.

<Fluorine-Containing Elastomer (A)>
    Fluorine-containing elastomer comprising two components of VdF and HFP prepared by a known process (VdF:HFP=78:22 (% by mole))
    Mooney Viscosity: 40 (ML(1+10) 100° C.)

<Fluorine-Containing Elastomer (B)>
    Fluorine-containing elastomer comprising three components of VdF, TFE and HFP prepared by a known process, i.e. iodine transfer polymerization method (VdF:TFE:HFP=50:20:30 (% by mole))
    Mooney Viscosity: 50 (ML(1+10) 100° C.)

<Acid Acceptor>
Hydrotalcite 1: $Mg_6Al_2(OH)_{16}CO_3 \cdot 4H_2O$ (DHT-6 available from Kyowa Chemical Industries, Co., Ltd.) [in the general formula (1), x=0.25, m=0.50]
Hydrotalcite 2: $Mg_{4.5}Al_2(OH)_{13}CO_3 \cdot 3.5H_2O$ (DHT-4A available from Kyowa Chemical Industries, Co., Ltd.) [in the general formula (1), x=0.31, m=0.539]
Hydrotalcite 3: $Mg_{4.5}Al_2(OH)_{13}CO_3 \cdot AH_2O$ (DHT-4A-2 (dehydrated DHT-4A, A: 0 to 3.5) available from Kyowa Chemical Industries, Co., Ltd.) [in the general formula (1), x=0.31, m=0.539]
MgO: KYOWAMAG 150 (available from Kyowa Chemical Industries, Co., Ltd.)
$Ca(OH)_2$ CALDIC 2000 (available from Ohmi Chemical Industry Co., Ltd.)

<Crosslinking Agent>
    Polyol crosslinking agent: Bisphenol AF
    Peroxide crosslinking agent: PERHEXA 25B (available from NOF CORPORATION)

<Crosslinking Accelerator>
    Polyol crosslinking accelerator: DBU-B
    Peroxide crosslinking accelerator: Triallylisocyanurate (TAIC) (available from Nippon Kasei Chemical Co., Ltd.)

<Additive>
    Carbon black N774: SEAST S (available from Tokai Carbon Co., Ltd.)
    Carbon black N990: THERMAX MT (available from Cancarb Co., Ltd.)

Example 1

Kneading with two 8-inch rolls was carried out using 1.3 parts by weight of the above-mentioned polyol crosslinking agent Bisphenol AF and 0.15 part by weight of the crosslinking accelerator DBU-B based on 100 parts by weight of the fluorine-containing elastomer (A). Subsequently, 3 parts by weight of the above-mentioned Hydrotalcite 1 (DHT-6 available from Kyowa Chemical Industries, Co., Ltd.) and 13 parts by weight of Carbon black N774 (SEAST S available from Tokai Carbon Co., Ltd.) were blended thereto, followed by kneading at 20° to 70° C. with two 8-inch rolls by a usual method. The kneaded mixture was subjected to maturation at 25° C. for about 20 hours and then kneading again with the same rolls to prepare the fluorine-containing elastomer composition.

Measurement of vulcanization characteristics and physical properties in normal state and immersion test were carried out by the mentioned methods by using the obtained fluorine-containing elastomer composition, and the results are shown in Table 2.

Examples 2 to 7 and Comparative Examples 1 to 6

The respective fluorine-containing elastomer compositions were prepared in the same manner as in Example 1 except that the components of the fluorine-containing elastomer compositions were changed as shown in Table 1. Measurement of vulcanization characteristics and physical properties in normal state and immersion test were carried out by the mentioned methods by using the obtained fluorine-containing elastomer compositions, and the results are shown in Table 2.

TABLE 1

| | Example | | | | | | | Comparative Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Composition (parts by weight) | | | | | | | | | | | | | |
| Fluorine-containing elastomer (A) | 100 | 100 | 100 | 100 | 100 | 100 | 100 | 100 | 100 | — | — | — | — |
| Fluorine-containing elastomer (B) | — | — | — | — | — | — | — | — | — | 100 | 100 | 100 | 100 |
| Bisphenol AF | 1.30 | 1.30 | 1.30 | 1.30 | 1.30 | 1.30 | 1.30 | 1.30 | 1.30 | — | — | — | — |

TABLE 1-continued

|  | Example | | | | | | | Comparative Example | | | | | |
|---|---|---|---|---|---|---|---|---|---|---|---|---|---|
|  | 1 | 2 | 3 | 4 | 5 | 6 | 7 | 1 | 2 | 3 | 4 | 5 | 6 |
| DBU-B | 0.15 | 0.15 | 0.15 | 0.15 | 0.15 | 0.15 | 0.15 | 0.15 | 0.15 | — | — | — | — |
| Carbon black N774 | 13 | 13 | 13 | 13 | 13 | 13 | 13 | 13 | 13 | — | — | — | — |
| Carbon black N990 | — | — | — | — | — | — | — | — | — | 20 | 20 | 20 | 20 |
| Hydrotalcite 1 | 3 | — | — | — | — | — | — | — | — | — | — | — | — |
| Hydrotalcite 2 | — | 3 | — | 3 | 3 | 3 | 3 | — | 3 | 3 | — | — | — |
| Hydrotalcite 3 | — | — | 3 | — | — | — | — | — | — | — | — | — | — |
| MgO | — | — | — | — | 1 | — | 1 | 3 | 3 | — | 3 | — | 3 |
| Ca(OH)$_2$ | — | — | — | 0.2 | — | 1 | 1 | 6 | 6 | — | — | 6 | 6 |
| TAIC | — | — | — | — | — | — | — | — | — | 4 | 4 | 4 | 4 |
| PERHEXA 25B | — | — | — | — | — | — | — | — | — | 1.5 | 1.5 | 1.5 | 1.5 |

TABLE 2

|  |  | Example | | | | | | | Comparative Example | | | | | |
|---|---|---|---|---|---|---|---|---|---|---|---|---|---|---|
|  |  | 1 | 2 | 3 | 4 | 5 | 6 | 7 | 1 | 2 | 3 | 4 | 5 | 6 |
| Vulcanization characteristics | | JSR type Curastometer II (160° C.) | | | | | | | | | | | | |
| Minimum viscosity (ML) | N | 1.6 | 1.3 | 1.4 | 1.2 | 1.3 | 1.4 | 1.4 | 2.2 | 2.0 | 0.5 | 1.1 | 0.5 | 0.8 |
| Maximum viscosity (MH) | N | 15.7 | 15.7 | 14.7 | 14.7 | 15.7 | 16.7 | 18.6 | 20.7 | 24.4 | 55.9 | 52.2 | 54.0 | 55.5 |
| Induction time (T10) | min | 13.6 | 12.7 | 20.5 | 10.5 | 13.3 | 13.2 | 12.0 | 7.4 | 5.8 | 1.0 | 1.1 | 1.1 | 1 |
| Optimum vulcanization time (T90) | min | 19.0 | 22.2 | 41.2 | 19.3 | 22.1 | 21.1 | 19.3 | 13.1 | 2.29 | 2.5 | 2.4 | 2.7 | 2.5 |
| Physical properties at normal state | | | | | | | | | | | | | | |
| 100% modulus | MPa | 2.3 | 2.1 | 2.3 | 1.9 | 2.1 | 2.1 | 2.3 | 2.7 | 2.9 | 3.5 | 3 | 3.1 | 3.5 |
| Tensile strength | MPa | 15.6 | 16.2 | 16.0 | 16.9 | 16.1 | 16.9 | 15.5 | 13.8 | 14.8 | 16.8 | 18.2 | 18.8 | 16.8 |
| Elongation | % | 325 | 315 | 375 | 425 | 370 | 375 | 350 | 305 | 315 | 260 | 295 | 325 | 260 |
| Hardness (Shore A) | — | 66 | 67 | 65 | 66 | 67 | 65 | 67 | 67 | 69 | 70 | 70 | 72 | 70 |
| Immersion test 1 | | pentadecane (90% by volume)/oleic acid (10% by volume) | | | | | | | | | | | | |
| ΔV | % | 0 | 0 | 1 | 1 | 1 | 1 | 2 | 4 | 16 | 16 | 19 | 20 | 22 |
| Surface condition | — | 3 | 3 | 3 | 3 | 3 | 3 | 3 | 1 | 1 | 1 | 1 | 1 | 1 |
| Immersion test 2 | | pentadecane (90% by volume)/methyl oleate (10% by volume) | | | | | | | | | | | | |
| ΔV | % | 0 | 0 | 0 | 0 | 0 | 1 | 1 | 1 | 1 | 1 | 1 | 1 | 1 |
| Surface condition | — | 3 | 3 | 3 | 3 | 3 | 3 | 3 | 2 | 2 | 2 | 2 | 2 | 2 |

INDUSTRIAL APPLICABILITY

The fluorine-containing elastomer composition of the present invention can provide a molded article having excellent flexibility, fuel barrier property, heat resistance, chemical resistance and oil resistance since hydrotalcites are contained therein.

The invention claimed is:

1. A molded article obtained by crosslinking a fluorine-containing elastomer composition comprising a polyol-crosslinkable fluorine-containing elastomer, a polyol crosslinking agent, an acid acceptor, and a hydrotalcite,
   wherein the acid acceptor comprising only an oxide or hydroxide of a divalent metal is contained in an amount of not more than 2 parts by weight based on 100 parts by weight of the fluorine-containing elastomer; and
   the hydrotalcite is contained in an amount of 0.1 to 6 parts by weight based on 100 parts by weight of the fluorine-containing elastomer.

2. The molded article of claim 1, wherein the hydrotalcite is a compound represented by the general formula (1):

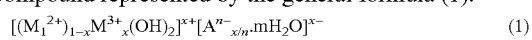  (1)

wherein $M_1^{2+}$ is a divalent metal ion, $M^{3+}$ is a trivalent metal ion, $A^{n-}$ is a n-valent anion, x is a numerical value satisfying $0<x<0.5$, m is a numerical value satisfying $0 \leq m$.

3. The molded article of claim 2, wherein in the general formula (1), $M_1^{2+}$ is $Mg^{2+}$ and/or $Zn^{2+}$, $M^{3+}$ is $Al^{3+}$, and $A^{n-}$ is $CO_3^{2-}$.

4. The molded article of claim 1, wherein the fluorine-containing elastomer composition does not contain a peroxide crosslinking agent.

5. The molded article of claim 1, wherein the molded article is a sealing material.

6. The molded article of claim 1, wherein the molded article is a fuel hose.

7. The molded article of claim 2, wherein the fluorine-containing elastomer composition does not contain a peroxide crosslinking agent.

8. The molded article of claim 3, wherein the fluorine-containing elastomer composition does not contain a peroxide crosslinking agent.

9. The molded article of claim 2, wherein the molded article is a sealing material.

10. The molded article of claim 3, wherein the molded article is a sealing material.

11. The molded article of claim 2, wherein the molded article is a fuel hose.

12. The molded article of claim 3, wherein the molded article is a fuel hose.

* * * * *